Jan. 18, 1938. A. C. KIRSHNER 2,105,660
MERCHANDISE TICKET PRINTER
Filed Feb. 1, 1936 4 Sheets-Sheet 1
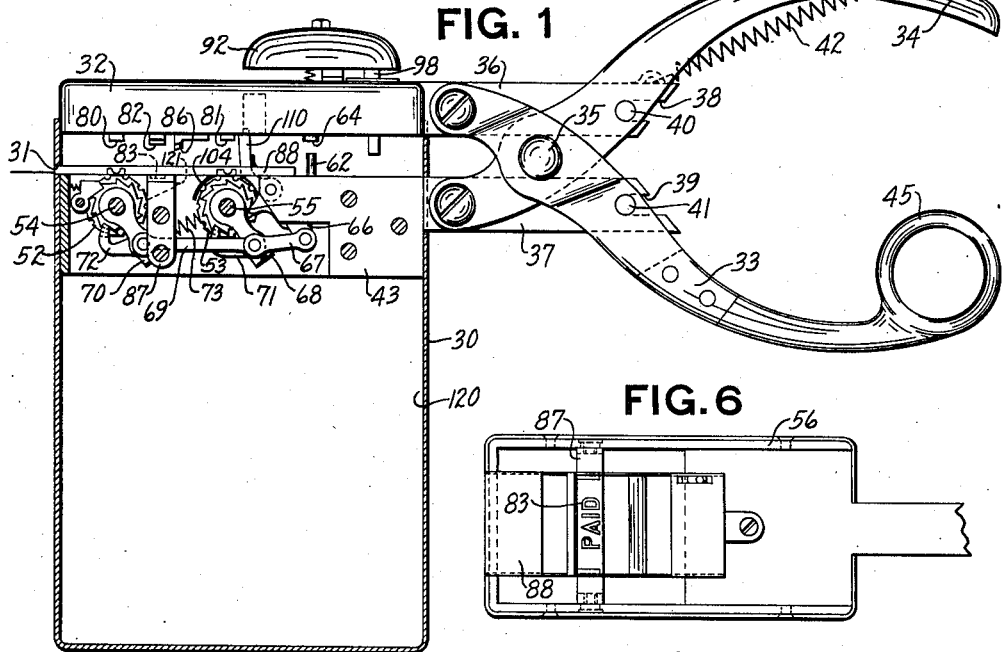
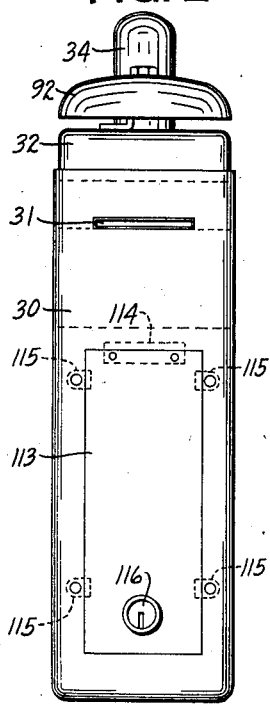
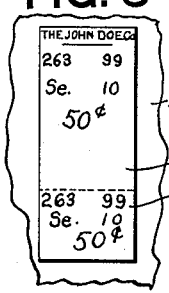
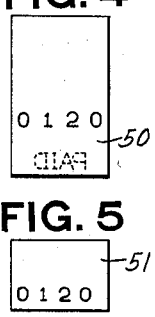
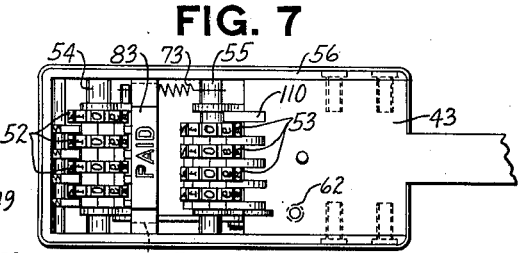
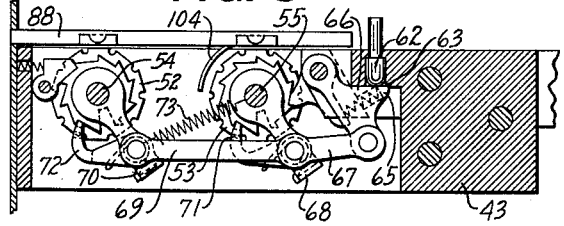
Inventor
Arthur C. Kirshner
By
His Attorney Jan. 18, 1938.  A. C. KIRSHNER  2,105,660
MERCHANDISE TICKET PRINTER
Filed Feb. 1, 1936   4 Sheets-Sheet 2
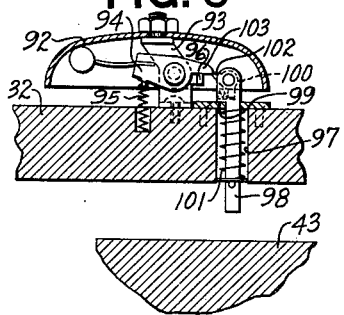
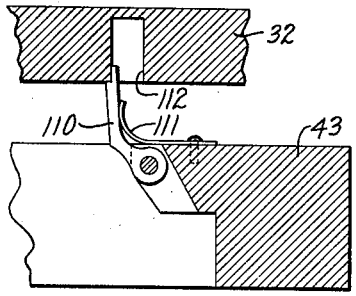
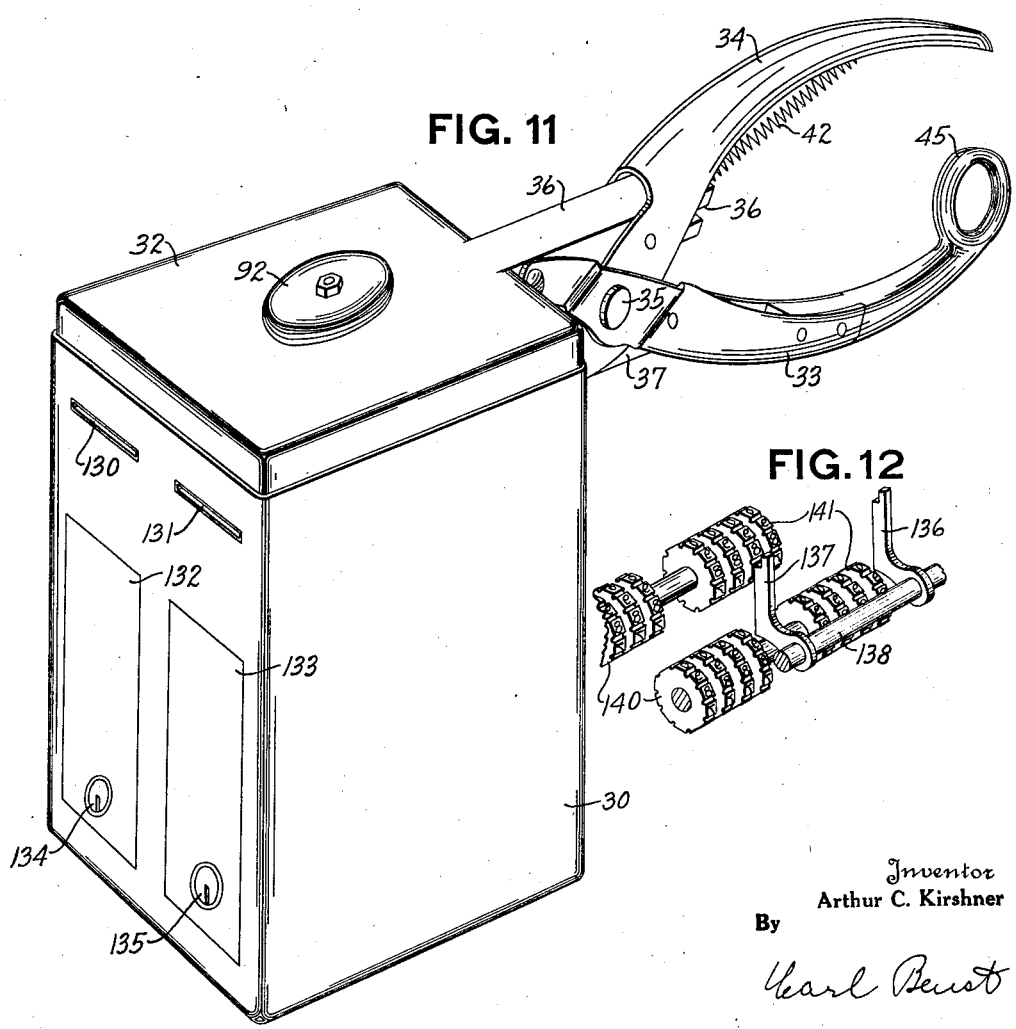
Inventor
Arthur C. Kirshner
By
Earl Beust
His Attorney Jan. 18, 1938.   A. C. KIRSHNER   2,105,660
MERCHANDISE TICKET PRINTER
Filed Feb. 1, 1936   4 Sheets-Sheet 3
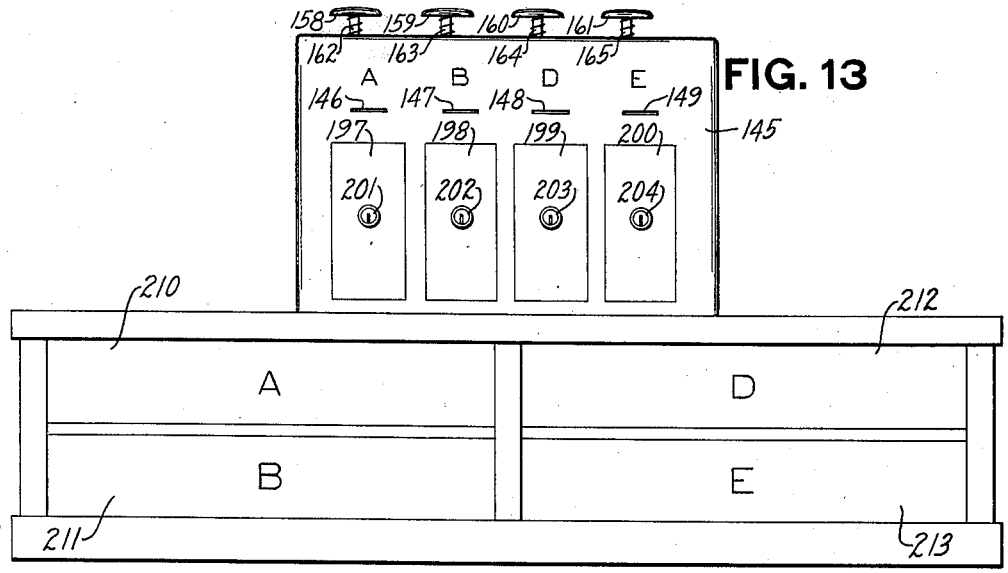
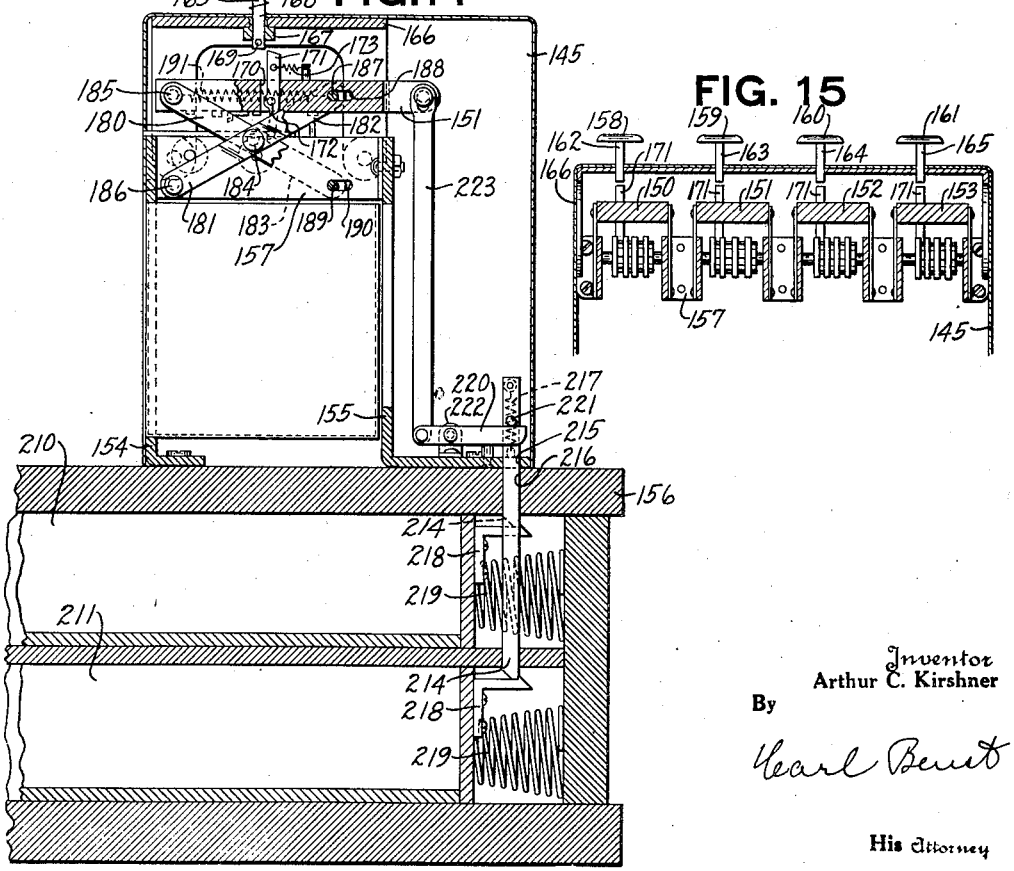
Inventor
Arthur C. Kirshner
By
Earl Bennet
His Attorney Jan. 18, 1938.  A. C. KIRSHNER  2,105,660
MERCHANDISE TICKET PRINTER
Filed Feb. 1, 1936  4 Sheets-Sheet 4
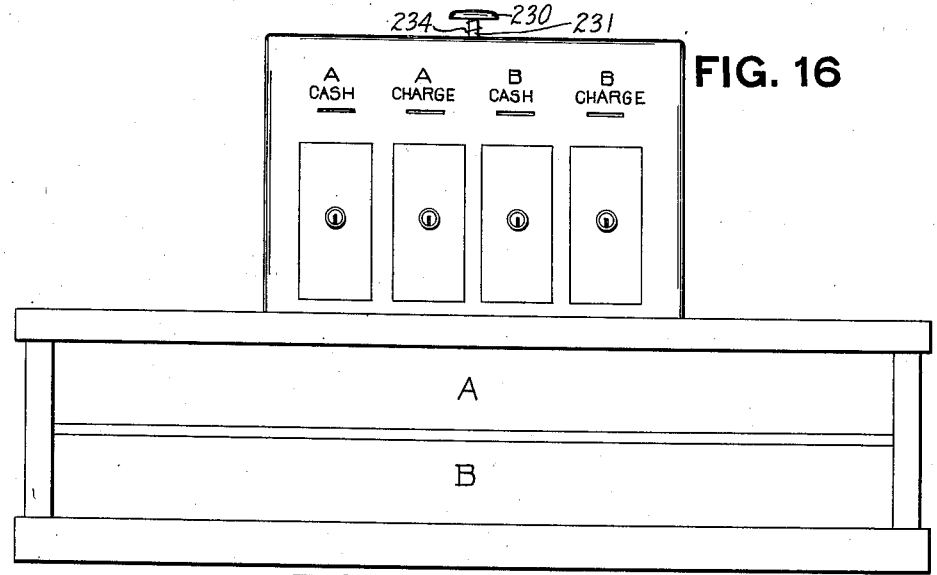
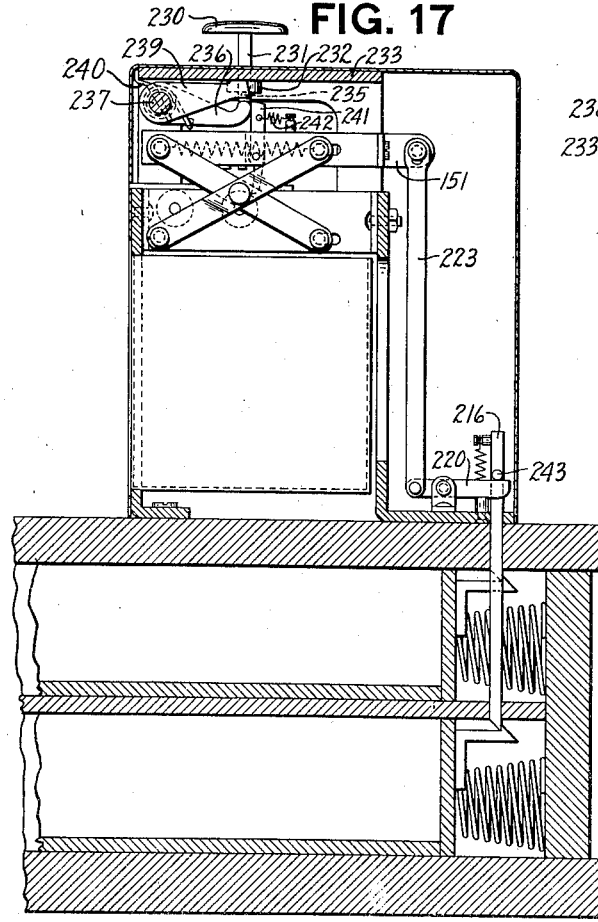
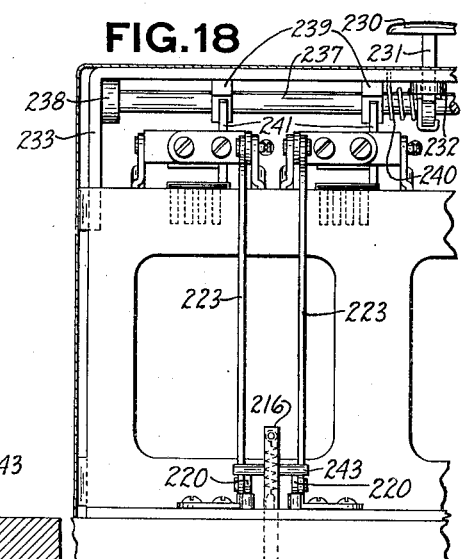
Inventor
Arthur C. Kirshner
By
His Attorney Patented Jan. 18, 1938

2,105,660

UNITED STATES PATENT OFFICE 2,105,660

MERCHANDISE TICKET PRINTER

Arthur C. Kirshner, Dayton, Ohio, assignor to The National Cash Register Company, Dayton, Ohio, a corporation of Maryland Application February 1, 1936, Serial No. 61,921

8 Claims. (Cl. 101—69)

This invention relates to a simple and inexpensive type of portable sales record machine which may be carried about by the operator, and which is adapted especially for use in connection with systems employing pin tickets or similar price tags usually attached to the merchandise.

It is, therefore, an object of this invention to provide a new and novel inexpensive type of portable machine which will overcome merchant's objections to larger, and more expensive types of registers and similar devices which occupy a considerable amount of counter space and make it necessary for the sales clerk to go back and forth from the customers to the machine to record the sales.

Another object is to provide an inexpensive and efficient sales record machine which requires no electric motor, no receipt nor detail paper, and no sales books.

An additional object is to provide a sales record machine which entirely eliminates the possibility of error where it is usually necessary for the clerk to read the price from the price ticket on the merchandise and write it on the sales book or set it up on the keys of a register.

A further object is to provide a machine which uses the original price ticket placed on the merchandise in the marking room as a medium for the control of the cash.

A still further object is to provide a machine which compels the clerk to detach a stub from the price ticket which is used for the purpose of keeping a stock control or perpetual inventory.

It is also an object of this invention to provide a new and novel machine having a common operating means adapted to operate the selected one of a plurality of printing and severing mechanisms under control of an inserted price ticket.

Another object is to provide a portable sales record machine adapted to have inserted therein a price ticket, print a consecutive number on two portions of said ticket, print or emboss upon the main body of said ticket the word "Paid", sever a portion of said ticket from the main body thereof, operate an audible signal, and simultaneously therewith deposit the severed portion of said ticket in a receptacle provided for that purpose.

A further object is to provide a simple and inexpensive type of sales record machine adapted to have inserted therein a price ticket, print a consecutive number on two portions of said ticket, print or emboss upon the main body of said ticket the word "Paid", sever a portion of said ticket from the main body thereof, operate an audible signal, deposit the severed portion of said ticket in any one of a plurality of receptacles provided for the purpose of classifying the transactions according to class, department or clerk, and simultaneously therewith operate one of a plurality of cash drawers provided for the purpose of segregating the cash according to the classification of the transaction.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 represents a vertical section view through the left side of the machine, showing the printing and severing mechanism and the operating means therefor.

Fig. 2 is a rear elevation of the machine shown in Fig. 1.

Fig. 3 is a facsimile of the price ticket secured to a piece of merchandise.

Fig. 4 is a facsimile of the back of the main body of the ticket, after the stub has been severed therefrom, showing the consecutive number and the word "Paid" printed thereon.

Fig. 5 is a facsimile of the back of the severed portion of the ticket.

Fig. 6 is a plan view of the upper impression means.

Fig. 7 is a plan view of the printing mechanism.

Fig. 8 is a detail side view of the consecutive number printing mechanism.

Fig. 9 is a sectional view of the bell mechanism.

Fig. 10 is an enlarged detail side view of the device for preventing operation of the machine until a ticket is inserted therein.

Fig. 11 is a perspective view of a modified form of the invention provided with two sets of printing and severing mechanisms, both of which are actuated by a common operating means.

Fig. 12 is a detail perspective view of the device in a modified form of the invention for preventing operation of the machine until a ticket is inserted therein.

Fig. 13 is a front elevation of a modified form of the invention provided with four sets of printing and severing mechanisms and a like number of cash drawers.

Fig. 14 is a vertical cross sectional view of the left side of the machine shown in Fig. 13.

Fig. 15 is a front view of a portion of the consecutive number printing mechanisms employed in a modified form of the invention shown in Figs. 13 and 14.

Fig. 16 is a front elevation of a modified form of the invention, showing a machine provided with four sets of printing and severing mechanisms, all of which are actuated by a common operating means.

Fig. 17 is a vertical sectional view of the left side of the machine shown in Fig. 16.

Fig. 18 is a detail rear view of two of the sets of printing and severing mechanisms together with the common operating means therefor, embodied in the machine disclosed in Fig. 16.

General description

Described in general terms, the present invention in certain of its forms comprises a simple and inexpensive portable type of machine for keeping sales records, which machine may be conveniently carried about by the salesperson, thus eliminating the necessity of going back and forth from the customer to the machine to record a sale.

This machine uses the original price ticket placed on the merchandise in the marking room as a medium for the control of the cash and as a perpetual inventory. The price ticket has formed thereto a stub portion which is adapted to be severed from the main body thereof by the machine and dropped into a locked receptacle. The price of the merchandise, stock number, etc., are preprinted on both the main body of the ticket and on the stub portion thereof.

When recording a sale, the salesperson inserts the price ticket into the machine and manually operates the same. When the machine is thus operated, mechanism provided therein prints on the back side of both the main body of the price ticket and on the stub portion thereof a consecutive number, prints or impresses on the back side of the main body of the ticket the word "Paid", and any desirable identifying symbol such as a clerk's number, operates an audible signal, severs the stub portion of the ticket from the main body thereof and deposits it in a locked receptacle provided for that purpose.

The main body of the price ticket remains attached to the merchandise and is used by the customer as a receipt. In the event the merchandise is returned for any reason, the word "Paid" on the price ticket indicates that the sale was properly recorded, and the consecutive number thereon enables checking it up with the stub portion thereof which has been retained by the store for its record.

At the end of any specified period of time, the receptacle may be unlocked and the stub portions of the price tickets removed therefrom for the purpose of obtaining the amount of cash for which the clerk is responsible. These stubs may then also be used for inventory purposes. The key to the locked receptacle is usually in the possession of the manager or any other authorized person.

Means is provided for preventing operation of the machine until it is released by the insertion of a price ticket.

For the purpose of segregating the severed stubs into two separate groups, such, for example, as "Cash" and "Charge" transactions, the casing of the machine may be altered to accommodate two receptacles, each having associated therewith a separate printing and severing mechanism, and using a common bell and common operating means therefor. This modified form of the invention is illustrated in Fig. 11.

Several other modified forms of the present invention, in combination with a plurality of cash drawers, adapted for use on counters, are illustrated and later described herein.

Detailed description

This invention comprises a casing 30 (Figs. 1 and 2) having formed in the front side thereof an opening 31 adapted to receive an insertable price ticket. The casing 30 is provided with a separate lid 32 which is adapted to be moved downwardly, in parallel alignment with the casing 30, to perform the various functions of the machine.

The means for moving the lid 32 downwardly consists of a pair of hand levers 33 and 34 (Fig. 1) pivoted together at 35. The hand lever 33 is provided with a ring 45 by which the machine may be hung on a hook mounted in a belt worn by the operator. This also enables the operator to conveniently carry the machine by placing the forefinger through the ring 45. One end of the lever 33 is pivoted to the side of an extension 36 formed integral with, and projecting rearwardly from, the lid 32, while one end of the lever 34 is pivoted to the side of a somewhat similar extension 37 integral with a main frame 43 to which the casing 30 is secured. The rear ends of the extensions 36 and 37 are bifurcated at 38 and 39, respectively, to coact with studs 40 and 41 carried by the levers 34 and 33, respectively. The relationship between the levers 33 and 34 and the extensions 37 and 36 is such as to form a parallellogram, and therefore the lid 32 will be lowered in a vertical path whenever the levers 33 and 34 are operated. A spring 42 secured at one end to the lever 34 and at its opposite end to the extension 36, returns the levers 33 and 34 and their associated parts to their normal positions at the completion of the operation.

One type of price ticket which may be used in connection with the present invention is illustrated in Fig. 3. This ticket comprises a main body 50 (Fig. 4) having attached thereto a stub portion 51 (Fig. 5). The price ticket has printed thereon, in duplicate, once on the main body 50 and once on the stub portion 51, the price of the merchandise, serial number, and any other desired data. The main body 50 of the price ticket is fastened to the merchandise 49 in the usual manner. When recording a transaction on the present machine, the stub portion 51 of the price ticket is severed from the main body thereof and retained in the machine, as will be hereinafter described. The main body 50 of the price ticket remains on the merchandise and serves as the customer's receipt.

The machine is provided with two sets of consecutive number printing wheels 52 and 53 (Figs. 1, 7, and 8) which are adapted to print on the back of the inserted price ticket a consecutive number in duplicate. The wheels 52 print on the main body 50 of the ticket, while the wheels 53 print on the stub portion 52 thereof. The purpose of the consecutive number is to enable the identification of both the main body 50 and the stub portion 51 of the ticket at any future time.

The wheels 52 and 53 are mounted upon shafts 54 and 55, respectively, both of which are mounted in a U-shaped auxiliary frame 56 secured to the main frame 43. The consecutive number printing wheels are of the multiple tined pawl, deep notched transfed type, well known in the art and described in many patents, one of which is the patent to Thomas Carney, No. 876,295, dated January 7, 1908. A detailed description thereof will therefore not be given here.

Both sets of wheels 52 and 53 are advanced one step each time the machine is operated. To insure the simultaneous advancing of both sets of wheels 52 and 53 at the same time, a common actuating means therefor is provided. Such actuating means comprises a shouldered plunger 62 (Figs. 1 and 8) mounted in a counter-bored opening 63 in the frame 43. When the lid 32 is moved downwardly, during an operation of the machine, a hammer pin 64 carried by said lid strikes the plunger 62 and moves it downwardly. The plunger 62 rests on a shoulder 65 of an arm 66 connected by a link 67 to a yoke 68 (Figs. 1 and 8) mounted on the shaft 55, while the yoke 68 is connected by a link 69 to a yoke 70 mounted on the shaft 54. The yoke 68 carries a multi-tined pawl 71 for actuating the printing wheels 53, while the yoke 70 carries a multi-tined pawl 72 for actuating the printing wheels 52. A spring 73 fast at one end to the yoke 70 and at its opposite end to the shaft 55 constantly tends to rock, through the links 69 and 67, the yokes 70 and 68 and the arm 66 counter-clockwise. It is thus apparent that when the plunger 62 is moved downwardly during an operation of the machine, as above described, the lower end thereof rocks the arm 66 and, through the links 67 and 69, the yokes 68 and 70 clockwise, against the action of the spring 73, to advance the wheels 53 and 52 simultaneously one step of movement. The spring 73 acts to return the parts to their normal positions.

The lid 32 (Fig. 1) carries platens 80 and 81 for taking imprints from the printing wheels 52 and 53, respectively.

The lid 32 also carries a type bar 82 having raised characters which coact with a die 83, when the machine is operated, to emboss the word "Paid" upon the main body 50 of the inserted ticket. The die 83 is mounted in a bar 87 secured to the U-shaped auxiliary frame 56.

Any suitable type of ink ribbon device may be used in connection with the type wheels 52 and 53 and the platens 80 and 81 for printing upon the back of the insertable price ticket, in duplicate, a consecutive number.

For the purpose of guiding and properly aligning the price ticket as it is inserted into the machine, there is provided a chute 88 (Figs. 1, 6 and 8) screwed to the main frame 43.

The machine is provided with severing mechanism which, immediately following the printing of the consecutive number and the embossing of the word "Paid" on the inserted price ticket, severs the stub portion 51 from the main body 50 thereof. When the stub 51 is thus severed from the main body of the ticket, a guide plate 104 formed integral with and projecting downwardly from the chute 88 guides the severed stub so that it will drop into a receptacle 120 (Fig. 1) formed inside of the lower portion of the machine.

The severing mechanism comprises a stationary knife blade 121 formed on the bar 87 (Fig. 1) and a knife blade 86 carried by the lid 32. When the lid 32 is lowered, during an operation of the machine, the knife blade 86 coacts with the knife blade 121 to sever the stub portion 51 from the main body 50 of the inserted price ticket.

The machine is provided with an audible signal which is actuated each time the machine is operated. This signal consists of a bell 92 (Figs. 1 and 9) mounted on top of a bracket 93, the latter being screwed to the top of the lid 32. Pivoted to the side of the bracket 93 is a bell operating hammer 94. The hammer 94 is normally urged in a clockwise direction by a spring 95 but is limited in the extent of such movement by a stop 96 formed on the bracket 93. Mounted in an opening 97 in the lid 32 is a hammer operating plunger 98. A shoulder 99 formed on the upper portion of the plunger 98 normally holds the plunger in its normal position and limits the downward movement of the same. The left side of the plunger 98 is notched to carry a spring-pressed by-pass pawl 100 which is pivotally mounted therein.

When the machine is operated and the lid 32 is consequently moved downwardly, the plunger 98 moves downwardly therewith, until the lower end of the plunger 98 strikes the upper side of the frame 43. As the lid 32 continues its downward movement the plunger 98 is, through its contact with the frame 43, forced upwardly against the action of a spring 101 coiled around it. As the plunger 98 moves upwardly, a nose 102 formed on the pawl 100 coacts with the under side of a projection 103 formed on the hammer 94 and rocks the hammer counter-clockwise, against the action of the spring 95, until the nose 102 clears the end of the projection 103, when the hammer 94 is released to the action of the spring 95. The spring 95 immediately rocks the hammer 94 clockwise to strike and sound the bell 92.

When the operation of the machine is completed and the lid 32 is returned to its normal position by the spring 42 (Fig. 1), the plunger 98 (Fig. 9) is consequently moved upwardly out of contact with the frame 43. This releases the plunger 98 to the action of the spring 97 which moves said plunger downwardly to its normal position. As the plunger 98 is thus moved downwardly to its normal position, the nose 102 strikes the upper side of the projection 103 and, due to the flexibility of the pawl 100, wipes past the projection 103 and assumes its normal position under said projection.

The machine is also provided with a spring-pressed locking pawl 110 (Figs. 1 and 10) for preventing operation of the machine when no ticket is inserted therein. This pawl is pivoted to the frame 43 and is normally urged counter-clockwise by a light flat spring 111 to engage a shouldered portion of the pawl with the forward wall of an opening 112 formed in the lid 32. With the pawl 110 in this position the lid 32 is maintained in its home position, and it is impossible to operate the machine until the pawl 110 is rocked clockwise by an inserted price ticket. The spring 111 is screwed to the upper side of the frame 43.

When inserting a price ticket into the machine, the innermost edge of the ticket strikes the pawl 110 and rocks it slightly clockwise, against the action of the weak spring 111, thereby positioning the pawl 110 directly in line with the opening 112 in the lid 32. It is, therefore, apparent that with the pawl 110 in such moved position, the lid 32 is free to be moved downwardly during the operation of the machine.

Access to the receptacle or compartment 120 (Fig. 1), into which the severed portions of the price tickets are deposited, is gained through a door 113 (Fig. 2). This door is held in place at its upper end by a wide lug 114 secured thereto and at its lower end by a lock bolt (not shown).

The lug 114 and lock bolt overlap the inside edge of the casing 30 and thus hold the door 113 against outward movement. Four lugs 115 secured to the inside of the casing 30 serve to hold the door 113 against inward movement. A lock 116 mounted in the door 113 prevents opening of the door except by the proprietor or some other authorized person possessing a key to the same.

The above description of the mechanism, although given in mechanical detail, has been given in connection with the actual operation of the machine, and since the description is not especially lengthy, it is believed that a clear understanding of the operation of the machine may be had therefrom. Therefore, no further explanation of the operation of the machine will be given herein.

Modified form of portable machine

A modified form of the invention hereinbefore described and illustrated is shown in Figs. 11 and 12. This modified form is also portable and is especially adapted for segregating the severed stub portions of the price tickets according to class, department or clerk.

To accomplish the above mentioned result, a larger casing 30 and lid 32 are provided to accommodate two units, each unit comprising two sets of printing wheels 140 and 141 (Fig. 12) and a severing mechanism for each set of wheels, said mechanism being comprised of knife blades like the blades 86 and 121 shown in Fig. 1. Also two receptacles are provided, one associated with each unit, for receiving the severed portions of the price tickets. Both units are actuated by a common operating means including the levers 33 and 34 of Fig. 11. The machine is provided with a single bell 92 which is operated each time the machine is operated. Two slots 130 and 131 (Fig. 11) are provided in the front side of the casing 30, one slot being associated with each unit. The proper segregation of the severed portions of the inserted price tickets is determined by whichever one of the slots 130 and 131 the tickets are inserted into.

A latching mechanism for the lid 32 (Fig. 12) is provided in the modified form which is actuated by the insertion of a ticket in either one of the slots 130 and 131 to unlatch the common operating means.

Described more in detail, the modified form of this invention employs mechanism of the same type as that illustrated and described in connection with the preferred form. For instance, instead of using one printing and severing mechanism, like that previously described, the modified form is provided with two such mechanisms, both of which are actuated by a common operating means, which is also like that hereinbefore referred to. The same type of bell 92 is employed, which bell is operated each time the machine is operated. However, the casing 30 in this case is provided with two slots 130 and 131, instead of a single slot 31, for the purpose of separately printing and severing the tickets according to any particular classification desired. The casing 30 is also provided with two receptacles, like the receptacle 120, (one of which is associated with each unit), said receptacles having doors 132 and 133, one for each receptacle, for gaining access thereto. The doors 132 and 133 are provided with locks 134 and 135, respectively, for preventing any unauthorized person from gaining access to the receptacles.

The latching mechanism for the lid 32 comprises two locking pawls 136 and 137, like the pawl 110, secured on a shaft 138. The pawls 136 and 137 on the shaft 138 are mounted in the main frame 43 of the machine in the same manner as the pawl 110 heretofore described. Whenever either one of the pawls 136 and 137 is moved to its unlatching position by the insertion of a ticket into its respective unit, the other pawl is moved therewith, thereby releasing the machine for operation.

Each time the machine is operated both of the consecutive number printing mechanisms are simultaneously advanced one step so that, even though the severed stubs are segregated into two different classes, there will be no two stubs having printed thereon the same number.

The operation of this machine is the same as that described in connection with the preferred form, except that the classification of the transaction is determined by which one of the slots 130 and 131 the ticket is inserted into.

Modified form in combination with cash drawers

While the principal object of this invention is to provide a portable hand sales record machine, it is not intended to confine the invention to this one form or embodiment, as it is susceptible of embodiment in various other forms. For instance, a simple and inexpensive sales record machine may be obtained by combining a plurality of ticket printing and severing units, together with a like number of ticket receptacles, with a plurality of cash drawers. Such a machine would afford a greater number of classifications of the inserted price tickets, as well as furnish separate cash drawers for each classification. Such an embodiment of the invention is illustrated in Figs. 13, 14, and 15.

The modified form of the invention, as shown in the above mentioned figures, comprises a casing or cabinet 145 having formed in the front side thereof four slots 146, 147, 148 and 149, which are provided for receiving the inserted price tickets. Which classification the severed portion of the price ticket is to receive is determined by whichever one of the slots the ticket is inserted into, as will be later described.

Mounted within the casing 145 are four units, each unit comprising a printing and severing mechanism like that described heretofore in connection with the preferred form of the invention, one unit being associated with each one of the slots 146 to 149, inclusive.

The casing 145, instead of having a movable lid 32 carrying the upper portion of the printing and severing mechanism like that referred to in the preferred form of the invention, has mounted therein four blocks 150, 151, 152 and 153 (Figs. 14 and 15), one for each unit, each block carrying the upper portion of the printing and severing mechanism comprising its particular unit.

The casing 145 is secured to two transversely extending frames 154 and 155 (Fig. 14) screwed to the top of a base 156. Mounted between and secured to the frames 154 and 155 is an auxiliary frame 157 bent to form a plurality of U-shaped sections to provide a support for the lower portion of the printing and severing mechanism of each of the various units.

Inasmuch as the printing and severing mechanism of each of the four units is identically like that shown and described in connection with the preferred form of the invention, no further description thereof is thought necessary herein.

Each unit operates independently of the other.

Therefore, separate operating means is provided for each unit. The operating means comprises four push buttons 158, 159, 160 and 161 (Fig. 13), one for each unit. The buttons 158 to 161, inclusive, are each fast to the upper end of one of a plurality of plungers 162, 163, 164 and 165, respectively, loosely mounted in openings provided in the upper side of the casing 145. A U-shaped frame 166 (Figs. 14 and 15), secured at both ends to the frames 154 and 155, is provided with bearings 167 (Fig. 14), only one of which is shown, through which the plungers slide. Each one of the plungers is provided with a coil spring 168 which normally maintains it in its elevated position. Each one of the plungers carries near its lower end a pin 169 which normally bears against the under side of the bearing 167 and thereby limits the upward movement of the plunger by the spring 168.

Each of the blocks 150 to 153, inclusive, is provided with an opening 170 (Fig. 14) to accommodate a driving pawl 171. Each of these pawls is pivoted at 172 to its respective block and is held out of the path of movement of the plunger associated with that unit by a spring 173. Whenever a ticket is inserted into any one of the slots 146 to 149, inclusive, the innermost edge of said ticket strikes the lower end of the pawl 171 associated with that unit and rocks said pawl counter-clockwise to position it in the path of movement of said plunger. When the operator depresses the push button and plunger for that particular unit, the driving connection established by the positioning of the pawl in the path of movement of the plunger by the insertion of the price ticket causes the pawl 171 and its associated block to be moved downwardly with said plunger to perform the functions of the machine.

In order to insure a uniform movement of the block and to properly align the same as it is lowered in the manner above described, a lazy tong arrangement (Fig. 14) is provided between the block and the side supports provided by the bent frame 157 for each unit. Inasmuch as this arrangement is the same for each unit, a description of one unit will suffice for all. The block carrying the upper portion of the printing and severing mechanism and the stationary supports provided by the bent frame 157 for carrying the lower portion of said mechanism, are connected together on one side by two levers 180 and 181, and on the opposite side by two levers 182 and 183. The levers of each pair are pivoted together at 184. The left hand ends of the levers 180 and 183 are pivoted at 185 to the block, while the left hand ends of the levers 181 and 182 are pivoted at 186 to the side supports provided by the bent frame 157. The right hand ends of the levers 181 and 182 are connected together by a rod 187 extending through an elongated slot 188 formed in the block, while the right hand ends of the levers 180 and 183 are connected together by a rod 189 extending through a pair of elongated slots 190 formed in both of the side supports provided for that unit by the bent frame 157. It will be obvious that when the block is lowered in the manner above described, the slots 188 and 190 will permit parallel movement of the levers 180 to 183, inclusive, and at the same time such levers will perform the function of controlling the uniform movement of the block and maintain it in proper alignment.

After the operation of the machine is completed, the coil spring 168 returns its associated push button and plunger to their normal elevated positions. The corresponding block and the levers 180 to 183, incl., are returned to their normal positions by a spring 191, one end of which is secured to the left hand end of the block and the opposite end is fast to the rod 187.

The lower portion of the casing is provided with four separate compartments or receptacles, each like the receptacle 120 described in connection with the preferred form of the invention, one of said receptacles being associated with each one of the four units, for receiving the severed stub portions of the price ticket inserted into each one of their respective units.

The casing is provided on its front side with four doors 197, 198, 199 and 200, one for each of the above mentioned receptacles, for gaining access to the receptacles. The doors 197 to 200, inclusive, are each equipped with locks 201, 202, 203 and 204, respectively, for preventing any unauthorized person from gaining access to the receptacles.

Enclosed in the base 156 (Fig. 13) are four cash drawers 210, 211, 212 and 213, one of which drawers is associated with each unit. Whenever any one of the units is operated in the manner above described, the cash drawer associated with said unit is operated. The mechanism for operating the cash drawers will now be described.

Associated with the cash drawers (Fig. 14) are a plurality of latches 214 (only two of which are shown), one for each cash drawer. The frame 155 and the base 156 are provided with openings 215 and 216 respectively for each of the latches 214, said latches being adapted to slide therein. Each latch 214 is retained in its latched position by a spring 217, one end of which is fast to the upper end of the latch and the opposite end is secured to the frame 155. Screwed to the rear side of each cash drawer is a drawer keeper 218, the rear end of which is shaped in the form of a hook to engage the lower end of its associated latch 214, thereby holding its respective cash drawer in its closed position against the action of an expulsion spring 219 fast to the rear side of the base 156.

Screwed to the frame 155 (Fig. 14) are a plurality of brackets 222 (only one of which is shown), one for each cash drawer. Pivoted to each one of these brackets 222 is a lever 220 (only one of which is shown) for releasing the latches 214. When such latches are released the cash drawers are moved to their opened positions by means of the springs 219. The rear end of each lever 220 is located directly beneath a stud 221 carried by each of the latches 214, while the forward end of each lever 220 is connected to the block of its associated unit by a link 223. It is, therefore, apparent that whenever any one of the push buttons 158 to 161 is operated and the block associated therewith is lowered, the lever 220, through the link 223, is rocked counter-clockwise. Such counter-clockwise movement of the lever 220, through the rear end of such lever coacting with the stud 221 carried by its associated latch 214, raises the latch 214 to release the cash drawer to be moved to its opened position by its associated spring 219. The drawers are manually returned to their normal closed positions in the usual manner.

A brief description of the operation of this machine will now be given. As previously stated, this machine is capable of providing four different classifications of the severed portions 51 of the insertable price tickets. Such classification consists of segregating the severed portions of the tickets according to whichever one of the slots 146 to 149, inclusive, the tickets are inserted into. Insertion of a ticket into any one of the above mentioned slots positions the pawl 171 associated with that particular unit in the path of its corresponding plunger. Depression of the push button corresponding to the unit into which the ticket has been inserted moves its associated plunger downwardly to contact the pawl 171 and move said pawl and its associated block downwardly to advance the consecutive number printing wheels one step, print the consecutive number in duplicate on the back of said insertable ticket, emboss the word "Paid" on the main body of the ticket, sever the stub portion from the main body of the ticket and deposit it in the receptacle provided for that purpose. At the same time, through the mechanism above described, the cash drawer associated with the operated unit is released.

*Modified form*

A further modified form of the invention is disclosed in Figs. 16, 17, and 18. The machine thus illustrated is adapted to not only segregate the severed stub portions of the inserted price tickets according to salespersons but to also segregate such stubs of each salesperson according to "Cash" and "Charge" transactions. Therefore, only two cash drawers are provided, one for each salesperson operating the machine. Each time a price ticket is inserted into the machine and the machine operated, the cash drawer corresponding to the salesperson performing such operation is released, regardless of whether the transaction is "Cash" or "Charge".

This machine is similar to the machine disclosed in Figs. 13, 14, and 15, heretofore described, in that the casing thereof is provided with four slots into which the price tickets are inserted, the classification of the inserted ticket being determined by whichever one of the slots it is inserted into. Likewise, a separate unit, comprising a printing and severing mechanism like that illustrated and described in connection with the preferred form of the invention, is provided in connection with each one of said slots. Also, there is provided four receptacles for receiving the severed portions of the inserted price tickets, one of said receptacles being associated with each unit. The receptacles are each provided with a locked door for gaining access thereto. It is, therefore, thought unnecessary to give a further description of such mechanism herein.

The present modified form of the invention, however, provides a common operating means for all four of said units. The machine is constructed, however, so that only the unit associated with the slot into which a ticket is inserted is operated. This operating means will now be described in detail.

A push button 230, fast on the upper end of a plunger 231 slidably mounted in a bearing 232 carried by a U-shaped frame 233, is provided for operating the machine. The U-shaped frame 233 is like the frame 166 heretofore described. A coil spring 234 wound around the plunger 231 normally maintains the plunger in its elevated position. A pin 235 carried by the lower end of the plunger 231 normally bears against the underside of the bearing 232 and thus limits the extent of upward movement given to the plunger by the spring 234.

Whenever the push button 230 and plunger 231 are manually depressed during an operation of the machine, the lower end of the plunger 231 strikes the end of an arm 236 and rocks it clockwise. The arm 236 is secured to a shaft 237 journaled at each end in bearings 238 (only one of which is shown) carried by the frame 233. Also fast on the shaft 237 are four driving arms 239 (Figs. 17 and 18), only two of which are shown, one of said arms for operating each ticket printing and severing unit. Thus, when the arm 236 is rocked clockwise in the manner above described, the shaft 237 and the arms 239 are rocked clockwise therewith, against the action of a torsion spring 240 wound around the shaft 237, one end of which spring is fast to the frame 233 and the opposite end to the lower edge of the arm 236.

Each one of the four ticket printing and severing units is provided with a driving pawl 241. The pawls 241 are like the pawls 171, heretofore described, both in construction and operation. The pawls 241 are normally maintained in an ineffective position by springs 242 (only one of which is shown) holding the upper ends of such pawls out of the path of movement of the arms 239. Whenever a ticket is inserted into any one of the slots associated with the various units, the innermost edge of the ticket strikes the lower end of the pawl 241 associated with such unit and rocks said pawl counter-clockwise, against the action of the spring 242, to position the upper end thereof in the path of its corresponding arm 239. With the pawl 241 thus moved to its effective position, the arm 239 corresponding thereto, during its counter-clockwise movement, will strike the upper end of said pawl and move it downwardly to actuate said unit. The function of this type of unit has been previously described herein and therefore will not be further discussed here.

As previously stated, the present machine is provided with only two cash drawers, each drawer being associated with two of the ticket printing and severing units. Each cash drawer is operated when either one of its corresponding units is operated. The means for releasing the cash drawers is of the same construction as that illustrated in Fig. 14 and heretofore described, except that each cash drawer latch carries a pin 243 which is adapted to be actuated by either one of the latch operating levers 229 associated with the two units corresponding to said drawer. It is, therefore, thought unnecessary to give a detailed description of this mechanism. However, the differences in construction will be described.

Referring to Figs. 17 and 18, each unit is provided with a train of mechanism identical with that shown in Fig. 14 and includes a block 151, link 223 and latch operating lever 220. By referring to Fig. 18 it will be seen that the links 223 are arranged side by side and the latch 216 for each drawer is located between the links 223. The latch 216 is provided with a long pin 243 which protrudes from each side of the latch 216 and into the path of the latch levers 220. Thus, the insertion of a ticket into either one of the "A" slots or into either one of the "B" slots will condition the corresponding unit for operation by the push button 230. The operation of the push button 230, through the pawl 241, block 151, link 223 and lever 220 will raise the latch 216 to release the desired one of the cash drawers.

Since the operation of this machine is the same as that given in connection with the modified form illustrated in Figs. 13, 14, and 15, except that a common operating means is here provided for all of the units, no detailed description thereof is thought necessary.

While the mechanisms herein shown and described are admirably adopted to fulfill the objects primarily stated, it is to be understood that it is not intended to confine the invention to the forms of embodiment herein disclosed, for it is susceptible of embodiment in various other forms all coming within the sign of the claims which follow.

What is claimed is:

1. In a machine of the class described, the combination of an insertable ticket; a plurality of printing mechanisms; a common operating means therefor; and a plurality of members normally preventing operation of said means, said members adapted to be moved by the insertion of said ticket into the machine in relation to any one of said printing mechanisms to release said operating means for operation.

2. In a machine adapted to receive an insertable ticket, the combination of a plurality of units, each unit comprising a ticket printing and severing mechanism; common operating means therefor; and means normally preventing operation of said operating means, said means adapted to be moved by the insertion of said ticket into the machine in relation to any one of said units to release said operating means for operation.

3. In a machine adapted to receive an insertable ticket, the combination of a plurality of units, each unit comprising a ticket printing and severing mechanism; common operating means therefor comprising a pair of compressible levers; and means normally preventing operation of said operating means but adapted to be moved by the insertion of said ticket into the machine in relation to any one of said units to release said operating means for operation.

4. In a machine adapted to receive an insertable ticket, the combination of a plurality of units, each unit comprising mechanism adapted to print in duplicate on an inserted ticket and sever a stub portion from the main body thereof; a plurality of receptacles, one associated with each unit for receiving the severed portions of the tickets operated on by its corresponding unit; operating means for said units; and means normally preventing operation of the units by said operating means, said means adapted to be moved by the insertion of a ticket into the machine in relation to any one of said units to render said operating means effective to operate the unit.

5. In a machine of the class described, the combination of a hammer block; a manipulative means to actuate the hammer block; an interponent carried by the hammer block and normally disconnected from the manipulated means; insertable means to connect the interponent to the manipulative means; and a linkage means to support and guide the hammer block in a straight path.

6. In a machine adapted to receive insertable tickets, the combination of a plurality of units, each unit including mechanism for printing in duplicate on an insertable ticket and severing a stub portion from the main body of the ticket; a plurality of receptacles, one associated with each unit, into which are deposited the severed portions of the tickets; common operating means for said units; and a plurality of members, one associated with each unit, normally disconnected from said operating means, each of said members adapted to be moved by the insertion of a ticket into the machine in relation to its respective unit to connect its respective unit to the common operating means.

7. In a machine adapted to receive insertable tickets, the combination of a plurality of units, each unit including mechanism for printing in duplicate on an insertable ticket and severing a stub portion from the main body of the ticket; a plurality of receptacles, one associated with each unit, into which are deposited the severed portions of the tickets; a common operating means normally ineffective to operate said units; and a plurality of members, one associated with each unit, each of said members adapted to render the operating means effective to operate the unit associated therewith.

8. In a machine adapted to receive insertable tickets, the combination of a plurality of units, each unit including mechanism for printing in duplicate on an insertable ticket and severing a stub portion from the main body of the ticket; a plurality of receptacles, one associated with each unit, into which are deposited the severed portions of the tickets; a common operating means normally ineffective to operate said units; a plurality of members, one associated with each unit, each of said members adapted to render the operating means effective to operate the unit associated therewith; and an insertable ticket to actuate the member associated with the unit into which the ticket is inserted.

ARTHUR C. KIRSHNER.